United States Patent [19]

Coughenour

[11] 4,215,640
[45] Aug. 5, 1980

[54] BUTTONHOLE STITCH METHOD

[75] Inventor: Donald J. Coughenour, Morristown, N.J.

[73] Assignee: The Singer Company, Stamford, Conn.

[21] Appl. No.: 75,293

[22] Filed: Sep. 12, 1979

[51] Int. Cl.³ .............................................. D05B 3/06
[52] U.S. Cl. .............................. 112/264.1; 112/158 B
[58] Field of Search ............. 112/264.1, 158 B, 158 E, 112/158 R, 158 A, 158 D, 65, 437

[56] References Cited

U.S. PATENT DOCUMENTS

| | | | |
|---|---|---|---|
| 1,483,184 | 2/1924 | McCann | 112/264.1 X |
| 2,977,913 | 4/1961 | Schenkengel | 112/264.1 |
| 3,570,433 | 3/1971 | Weisz | 112/264.1 |
| 4,159,688 | 7/1979 | Garron et al. | 112/264.1 |

Primary Examiner—Peter P. Nerbun
Attorney, Agent, or Firm—Edward P. Schmidt; Robert E. Smith; Edward L. Bell

[57] ABSTRACT

A method of stitching a buttonhole in an electronically controlled sewing machine having the capability to generate a mirror image of a pattern. A first half of a buttonhole pattern is implemented which includes steps therein to return the work material to its starting position. Thereafter, a mirror image of the first half of the buttonhole pattern is implemented to provide a second half of the buttonhole which is perfectly symmetrical to the first half thereof. Additional reinforcing stitches about the cutting space of the buttonhole may be provided by the steps to return the work material to its starting position.

5 Claims, 8 Drawing Figures

Fig. 2
Fig. 3
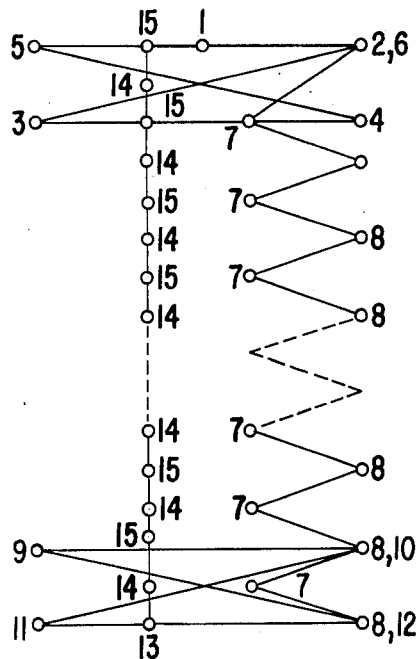
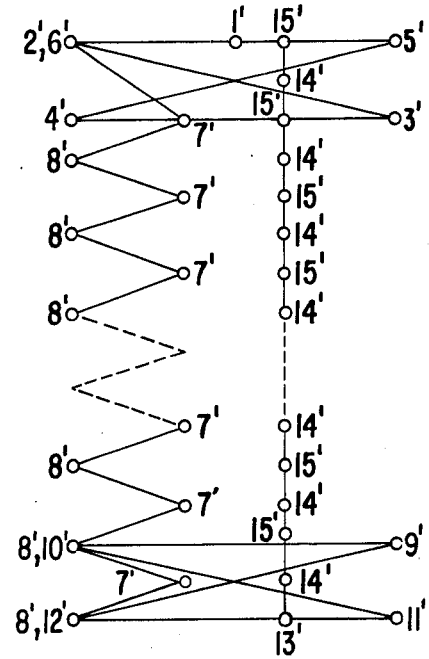
Fig. 4
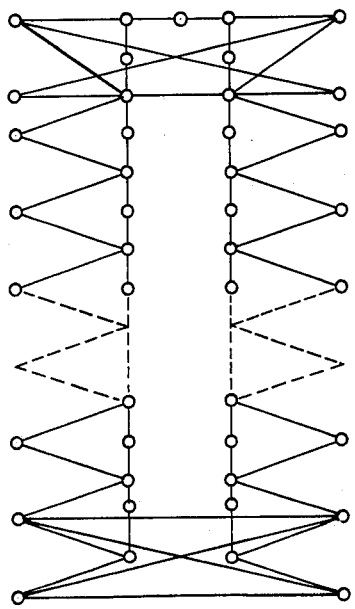

Fig. 5

| STITCH NO. | ENCODED DATA FOR BUTTONHOLE | | |
|---|---|---|---|
| | CODE | FEED INCREMENT | BIGHT POSITION |
| 1 | 1001001110 | 0.0 | 0.0 |
| 2 | 1001000110 | 0.0 | 0.120 |
| 3 | 0011110110 | 0.017 | -0.120 |
| 4 | 1001000110 | 0.0 | 0.120 |
| 5 | 1110110110 | -0.017 | -0.120 |
| 6 | 1001000110 | 0.0 | 0.120 |
| 7 | 0011101010 | 0.017 | 0.020 |
| 8 | 0011100111 | 0.017 | 0.120 |
| 9 | 1110110110 | -0.017 | -0.120 |
| 10 | 1001000110 | 0.0 | 0.120 |
| 11 | 0011110110 | 0.017 | -0.120 |
| 12 | 1001000110 | 0.0 | +0.120 |
| 13 | 1001010010 | 0.0 | -0.020 |
| 14 | 1110110010 | -0.017 | -0.020 |
| 15 | 1110110011 | -0.017 | -0.020 |
| 1' | 1001001110 | 0.0 | 0.0 |
| 2' | 1001011010 | 0.0 | -0.120 |
| 3' | 0011100110 | 0.017 | 0.120 |
| 4' | 1001011010 | 0.0 | -0.120 |
| 5' | 1110100110 | -0.017 | 0.120 |
| 6' | 1001011010 | 0.0 | -0.120 |
| 7' | 0011100010 | 0.017 | -0.020 |
| 8' | 0011110111 | 0.017 | -0.120 |
| 9' | 1110100110 | -0.017 | +0.120 |
| 10' | 1001011010 | 0.0 | -0.120 |
| 11' | 0011100110 | 0.017 | +0.120 |
| 12' | 1001011010 | 0.0 | -0.120 |
| 13' | 1001001010 | 0.0 | +0.020 |
| 14' | 1110101010 | -0.017 | +0.020 |
| 15' | 1110101011 | -0.017 | +0.020 |

BUTTONHOLE STITCH METHOD

DESCRIPTION

Background of the Invention

This invention is in the field of sewing machines; more particularly, it is concerned with a new method for making a buttonhole and the new buttonholes which may be made using this method.

Ideally, a buttonhole should provide a symmetrical appearance and, over the years, the prior art discloses that considerable effort has been expended to attain this objective. Thus, the U.S. Pat. No. 2,977,913, issued on Apr. 4, 1961 to Schenkengel discloses a method of sewing parallel rows of zig zag stitches all in the forward direction by having succeeding zig zag stitches overlay a straight stitch performed in the reverse direction. Subsequently, U.S. Pat. No. 3,570,433, issued on Mar. 16, 1971 to Weisz et al, discloses that the return straight stitch may be implemented by a basting stitch and, additionally, that the basting stitch may be placed under each row of zig zag stitches for even greater uniformity of appearance.

More recently, U.S. patent application Ser. No. 928,939, filed on July 28, 1978 now U.S. Pat. No. 4,159,688 by Odermann and Garron disclose a further improvement wherein narrow cording stitches are overlayed by wider final stitches to give a crowned appearance thereto, the cording stitches being effected in one direction while the final overlay stitches are implemented in the opposite direction. The U.S. patent application Ser. No. 036,209, filed on May 4, 1979 now U.S. Pat. No. 4,188,900 by Odermann and Garron discloses the further improvement of effecting the final overlay stitches in the forward direction while permitting the initial stitching to take place adjacent the edge of the garment.

There is always a desire to improve the buttonhole, for instance, by reinforcing the edge thereof or by making a more decorative buttonhole. Ideally, the insensitivity to feed balance, and less sensitivity to uniform density, should also be maintained.

SUMMARY OF THE INVENTION

These desired ends have now been achieved in an electronically controlled sewing machine having the capability to obtain a perfectly symmetrical mirror image of a pattern. With the mirror image feature activated, the pattern information for needle position is electronically inverted in an inverter circuit prior to acting thereon. Thus, succeeding patterns may be mirror images of each other. When applied to a buttonhole the mirror image may be initiated by a one step buttonhole foot actuating switch. The initial bar tack of the buttonhole is followed immediately by a side bar effected in the forward feed direction. The second bar tack is then completed and a line of straight stitches may be effected in the reverse direction back to the first bar tack at the edge of the cutting space for the second leg of the buttonhole which has not yet been implemented. When the first bar tack has been reached, the buttonhole presser foot will actuate the switch to initiate a mirror image of the stitches thus far accomplished. Thereupon, the initial bar tack will be reinitiated, however, as a mirror image of the initial bar tack. Thereafter, the second leg of the buttonhole will be effected, also as a mirror image of the first leg thereof. Similarly, a mirror image of the second bar tack will be accomplished and a final line of reverse stitches will take place back to the first bar tack on the inside of the first leg of the buttonhole. Thus, a buttonhole has been accomplished utilizing the mirror image feature which insures that the right and left side of the buttonhole are truly symmetrical and, additionally, reinforces the cutting space of the buttonhole by adding extra straight stitches therein.

Utilizing this technique, buttonholes having a more decorative appearance may be implemented which attain a measure of their strength from the reinforcing straight stitches along the cutting space. Thus, the side bars or legs of the buttonhole may be implemented by using relatively open decorative stitching which provides a relatively unique appearance when compared with the more normal method of implementing buttonholes.

BRIEF DESCRIPTION OF THE DRAWING

The foregoing will be more readily apparent upon reading the following description in conjunction with the drawings in which:

FIG. 2 is a representation of the first half of the buttonhole pattern formed, for the most part, in the usual fashion except with the addition of the reinforcing stitch adjacent the cutting space;

FIG. 3 is a representation of the second half of the buttonhole pattern formed utilizing the teachings of this invention by implementation of the mirror image capability of an electronically controlled sewing machine;

FIG. 4 is a representation of the buttonhole of FIGS. 2 and 3 combined as taught by the invention;

FIG. 5 is a table of encoded data for the buttonhole shown in FIG. 4;

DESCRIPTION OF THE PREFERRED EMBODIMENT

Figure 1:
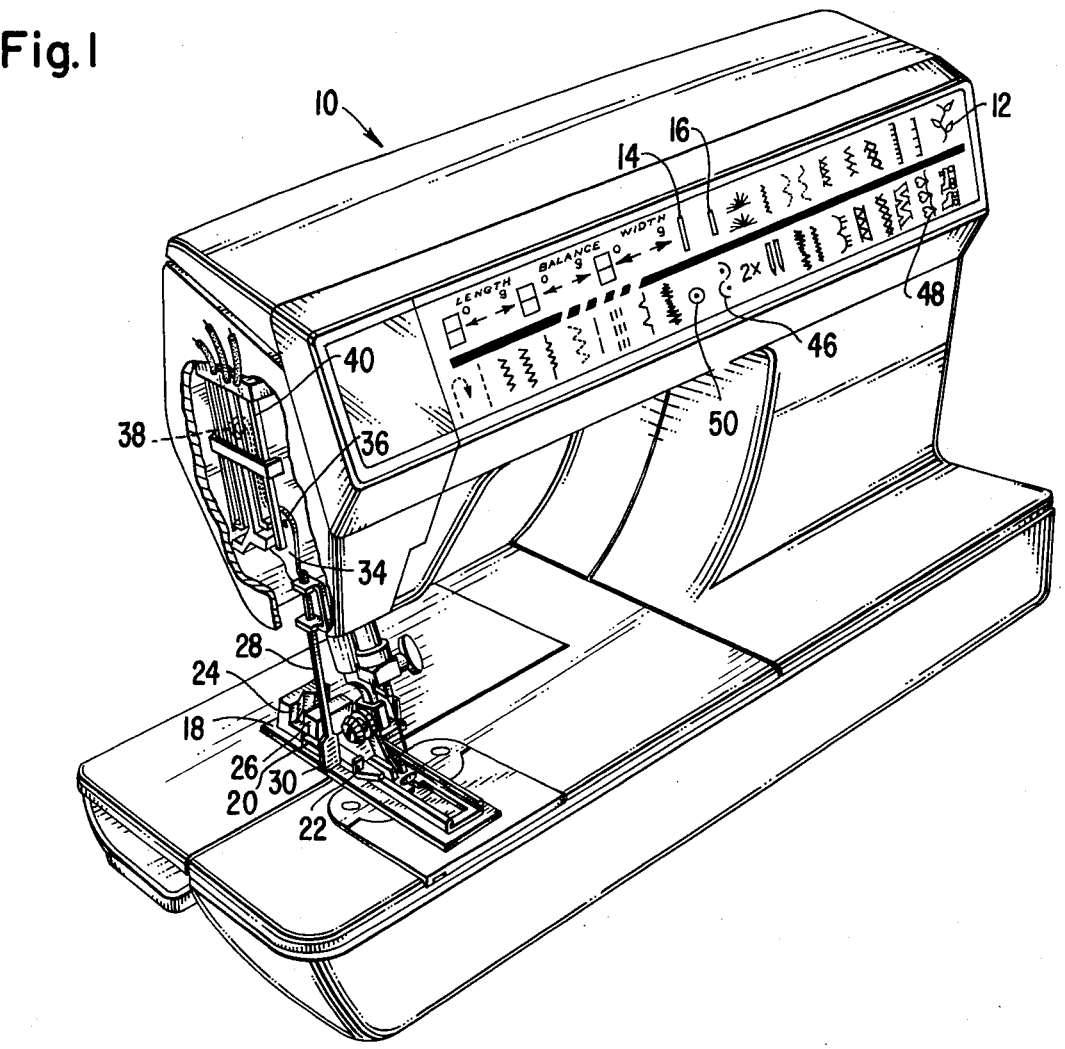
FIG. 1 is a perspective view of the sewing machine in which the method according to this invention may be practiced.

Referring to the drawings, FIG. 1 illustrates a sewing machine indicated generally at 10 having a control panel 12 illustratively of the type utilizing a continuous planar element such as a glass panel to which circuitry is applied as by deposition or the like to provide controls sensitive to the touch of an operators finger. Indicated on the control panel 12 are touch sensitive areas having respective representations of various stitch patterns which may be automatically sewn by the sewing machine 10.

The sewing machine 10 is provided with the capability of sewing either a large buttonhole, indicated by the large buttonhole representation 14 on the control panel 12, or a small buttonhole, indicated by the small buttonhole representation 16 on the control panel. When a buttonhole pattern is to be sewn, a buttonhole presser foot 18 is installed on the sewing machine 10. The buttonhole presser foot 18 includes a fixed rear stop member 20 and an adjustable front stop member 22, the distance therebetween defining the length of the buttonhole being sewn, as determined by the size of button inserted between an anchor element 24 and a buttonhole gauging element 26. The sewing machine 10 further includes a switch mechanism including a lever arm 28 terminating in a paddle 30 at its lower end. The other end of the lever arm 28 is received by openings in a pair of spaced lugs 32 formed on one end of a lever 34. The lever arm 28 may, therefore, be selectively raised and lowered by an operator, the operator lowering the lever arm 28 so that the paddle 30 is intermediate the stops 20 and 22 during the formation of a buttonhole pattern. The lever 34 is pivoted at 36; and at the end opposite the lug 32 has a pin 38 mounted thereon for cooperation with an electrical switch member 40. Manipulation of the paddle 30 on both ends of the buttonhole causes actuation of the electrical switch member 40, which actuation is fed to the electronic control unit for the sewing machine in order to initiate the next of a sequence of steps in the formation of a buttonhole. For further information with respect to the operation of the electrical switch member 40 and the electronic control package of the sewing machine, the reader is referred to U.S. patent application Ser. No. 928,939, filed on July 28, 1978, now U.S. Pat. No. 4,159,688 and assigned to the assignee of the present invention, the disclosure of which application is hereby incorporated by reference herein.

In addition to the representation of the large buttonhole 14 and the small buttonhole 16, the control panel 12 also has thereon the mirror image representation 46, activation of which is normally accomplished with activation of a pattern such as the tulip pattern, representation 48, in order to generate a pair of tulip patterns wherein the petals face in opposite directions. Adjacent the mirror image representation 46 there is the single pattern representation 50 which, for example, will cause the sewing machine 10 to generate a single tulip pattern 48 and thereupon suspend endwise reciprocation of the needle bar 52 and feeding of the feeding system of the sewing machine (not shown) until further operator instructions are received. Further particulars as to single pattern control may be had by reference to the U.S. Pat. No. 3,987,739, issued on Oct. 26, 1976 to Wurst et al, which patent is assigned to the same assignee as the instant invention, and is hereby incorporated by reference herein. Activation of the large buttonhole representation 14 or the small buttonhole representation 16 automatically actuates the single pattern representation 50 inasmuch as manufacture of a buttonhole is a single pattern operation.

Basic information on operation of electronic controls of the sewing machine 10 may be obtained by reference to the U.S. Pat. No. 3,855,956 issued on Dec. 24, 1974 to Wurst, which patent is hereby incorporated by reference herein. In that patent is disclosed the use of solid state memory storing digital information related to the positional coordinates for each stitch of a predetermined stitch pattern. A pulse generator driven in timed relation with the sewing machine produces a timing signal pulse between each successive stitch. The signal pulses are counted in a counter to provide a timed series of progressively increasing binary numbers corresponding to the progressively increasing number of stitches in the pattern. The counter output is applied as the address to the memory to recover therefrom the digital information related to the positional coordinates for each stitch of the predetermined pattern. The memory output is applied to control driving devices operatively connected to impart a controlled range of movement to the conventional stitch forming instrumentalities of the sewing machine to produce a specific predetermined position coordinate for the needle penetration during each stitch formation. A mirror image is obtained by inverting the digital information stored in the static memory prior to applying this information to the control driving device operatively connected to control needle position of the sewing machine. An inverting device is inserted in the circuit by activation of the mirror image representation 46 or, in an appropriate circumstance, by an actuation of the electrical switch member 40. Thus, upon selection of the large buttonhole representation 14, or the small buttonhole representation 16, the single pattern representation 50 is activated and the inverting function may be enabled by actuation of the electrical switch member 40 by the fixed rear stop member 20 after the completion of the first portion of the buttonhole as will be explained below.

Referring now to FIG. 2, there is shown the first half of a buttonhole implemented by the sewing machine 10 shown in FIG. 1. The stitch points in the buttonhole are indicated by small open circles with the stitch number closely adjacent thereto. The first six stitches form the upper bar. Coordinate data for the stitch points are shown in the table of FIG. 5 wherein for each stitch point there is listed the digital code word for the feed increment or decrement and for the bight position. In the digital code word the first five bits represent the feed increment information and the next five bits represent the bight position. The eleventh bit is a code bit which provides instructions to repeat the prior stitch. Thus, after the first bar tack is completed the 7th and 8th stitches are implemented, the 8th stitch carrying instructions in the code bit to repeat the prior 7th stitch. Thus, the first side bar or leg of the buttonhole is accomplished and when the electrical switch member 40 is actuated by the front stop member 22 manipulating the paddle 30, stitch number 9 is accomplished and the second bar tack of stitches 9 through 12 are completed. Thereupon, stitch 13 is set adjacent the cutting space for the opposite side of the buttonhole. Thereafter, stitches 14 and 15 are repeated in the reverse direction adjacent the cutting space for the buttonhole until the paddle 30 of the sewing machine 10 is actuated by the fixed rear stop member 20 of the buttonholing presser foot 18 thereby manipulating the electrical switch member 40 to initiate the release from the sewing machine static memory of digitally coded data which would be the mirror image of the half buttonhole already implemented.

The first stitch point for the second half of the buttonhole is as indicated in FIG. 3 and stitch number 1'. In the table of encoded data, FIG. 5, it will be evident that the code word for the stitch 1' is the same as stitch 1, including the five bits reserved for bight position. There are 12 discrete needle positions on either side of center needle position which is encoded 01111, or 15 (of 32). In order to obtain the code word for the mirror image of the needle position, a 1 is added to the bight code word and the code word is then inverted. Thus, 01111 plus 1 is 10000. The inversion on 10000 is 01111. Thus, the bight code word for stitch 1' is the same as the bight code word for stitch 1. The code word for stitch 2' is obtained by adding 1 to 00011. The resulting 00100 is inverted to 11011 and stitch number 2' is located in the full left needle position. The remainder of the stitch points for the second half of the buttonhole are obtained in a like manner until the buttonhole is completed.

Referring now to FIG. 4, the completed buttonhole is shown, which is a combination of FIGS. 2 and 3. This buttonhole exhibits the desired symmetry which is the result of generating the second half of the buttonhole as a mirror image of the first half. This buttonhole also has been reinforced along the cutting space by the straight stitch extending along both sides thereof and adding strength to the buttonhole. The additional straight stitches along both sides of the cutting space may be repeated as many times as it is felt necessary to obtain adequate reinforcing. This may be accomplished by back tacking and repeating the straight stitches or by completely encircling the cutting space during each half of the buttonhole.

Figure 6:
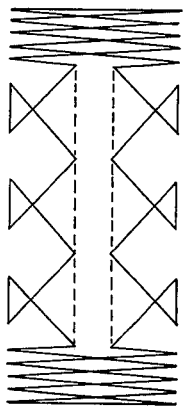
FIG. 6 is a view of one of the decorative buttonhole possibilities utilizing the teachings of this invention.
Figure 7:
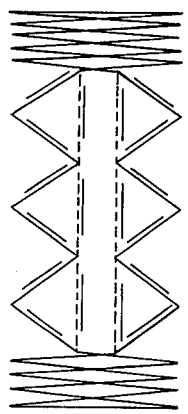
FIG. 7 is a representation of a second decorative buttonhole.
Figure 8:
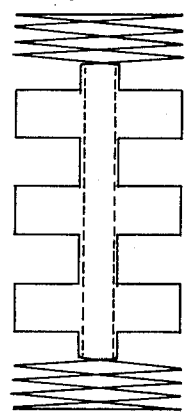
FIG. 8 is a representation of a third decorative buttonhole which may be implemented by utilizing the teachings of the invention.

In FIGS. 6, 7 and 8 there are shown other forms of buttonholes which may be implemented by this method and which have some decorative effect. These buttonholes may be implemented with essentially the same steps as the buttonhole described above. In the scope and form of buttonholes, the strength of the buttonhole may be increased by the addition of thread along side of the cutting space substantially as described by making extra passes in the straight stitch adjacent the cutting space. Alternatively to the straight stitch, the return stitching may be made by a pattern different than the initial pattern, thereby heightening the decorative effect.

In the foregoing, the invention has been described with reference to specific illustrative methods. It will be evident, however, to those skilled in the art, that variations and modifications, as well as the substitution of equivalent steps for those shown and disclosed through illustration, may be made without departing from the broader scope and spirit of the invention, as set forth in the appended claims. The specification and the drawing are accordingly to be regarded in an illustrative rather than in a limiting sense.

I claim:

1. A method of producing a buttonhole on a sewing machine having means thereon for making at least one pattern of stitches, and means for generating a mirror image of said at least one pattern of stitches, said method comprising the steps of:
   a. stitching a first leg of said buttonhole in a first direction extending the length thereof;
   b. returning to the starting position of said first leg by stitching in a second direction reverse to said first direction; and,
   c. activating said generating means to have said sewing machine implement a mirror image of steps a and b.

2. A method of producing a buttonhole as claimed in claim 1 further comprising:
   d. stitching a first bar tack for a first end of said buttonhole prior to implementation of step a above; and,
   e. stitching a second bar tack for a second end of said buttonhole at the free end of said first leg after completion of step a above.

3. A method of producing a buttonhole on a zig zag sewing machine having means for making at least one pattern of stitches, and means for generating a mirror image of said at least one pattern of stitches, said method comprising the steps of:
   a. stitching along a first leg of said buttonhole extending the length thereof;
   b. stitching along a second leg of said buttonhole adjacent the cutting space thereof extending the length thereof; and,
   c. activating said generating means to have said sewing machine implement a mirror image of steps a and b.

4. A method of producing a buttonhole as claimed in claim 3 further comprising the steps of:
   d. stitching a first bar tack for a first end of said buttonhole prior to step a; and,
   e. stitching a second bar tack for a second end of said buttonhole at the free end of said first leg after implementation of step a.

5. A method of producing a buttonhole as claimed in claim 4 wherein said stitching in step b is implemented by a straight stitch adjacent the cutting space and the second leg of said buttonhole.

* * * * *